May 26, 1925. 1,539,627
J. L. BATES
CULTIVATOR
Filed Sept. 27, 1923 2 Sheets-Sheet 1
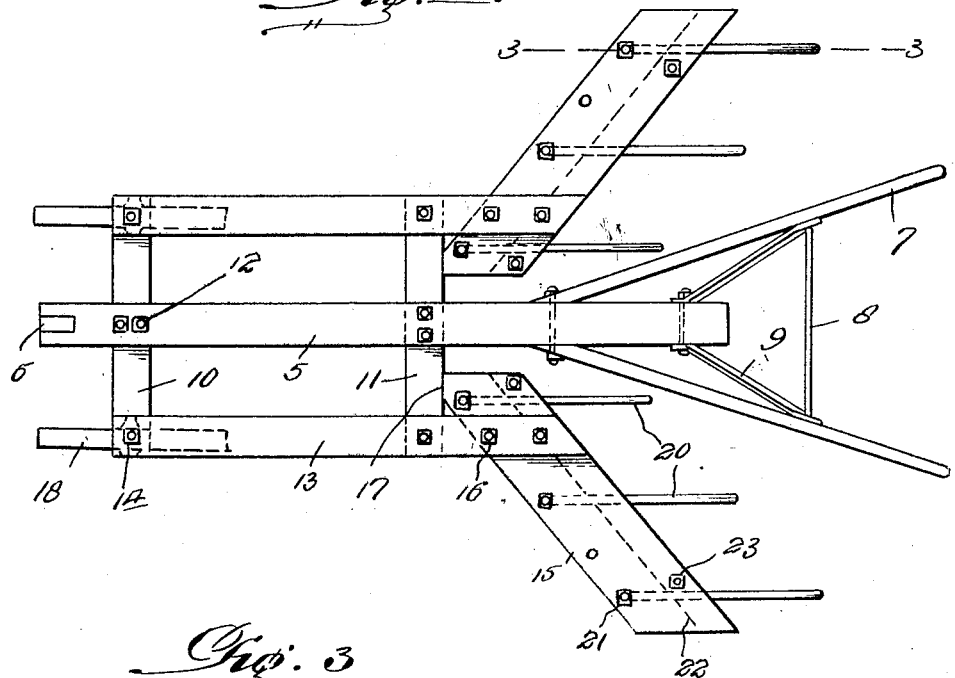
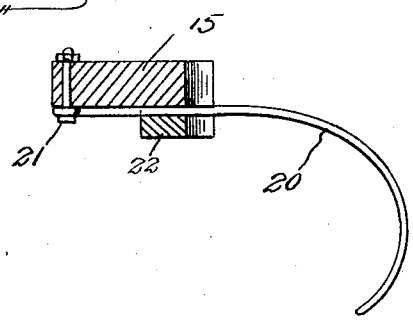

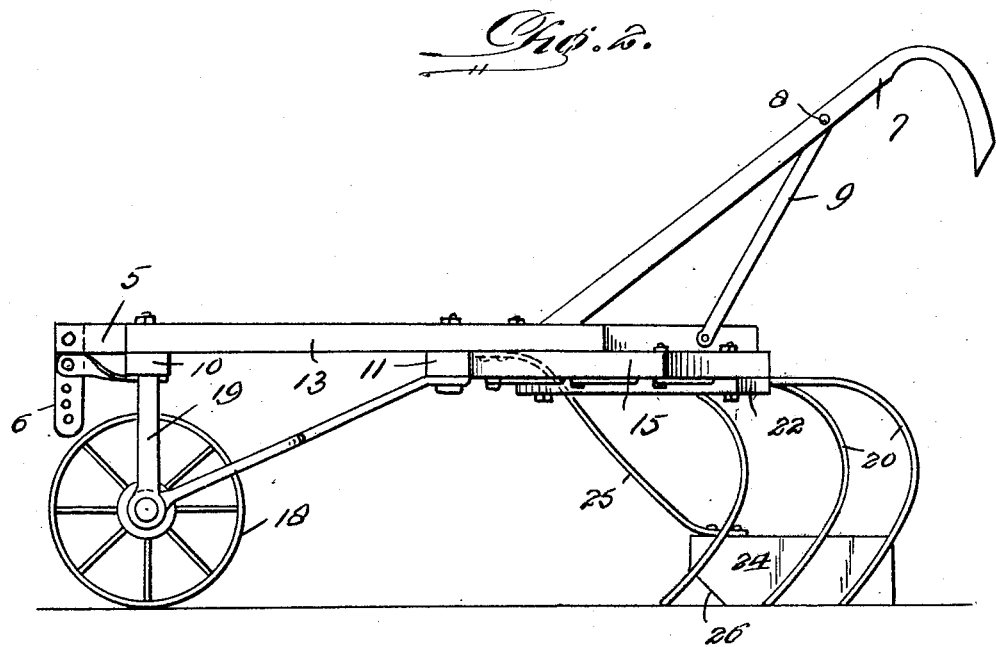
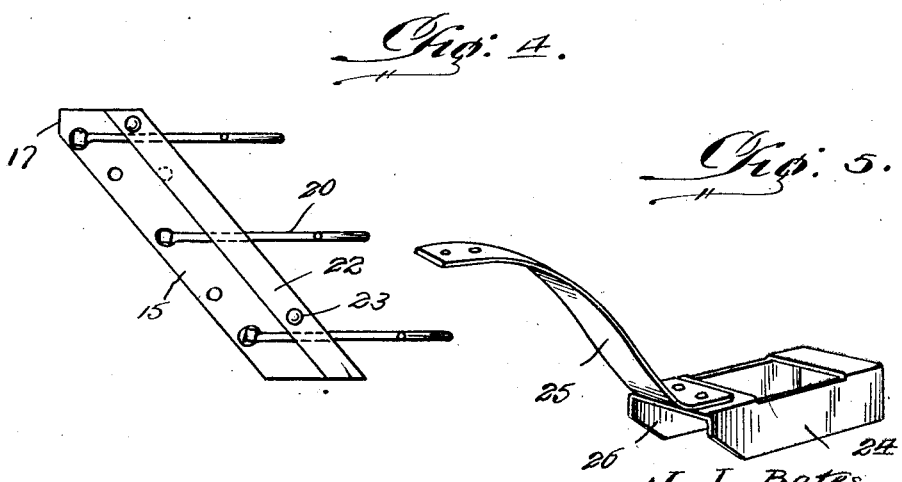

Patented May 26, 1925.

1,539,627

UNITED STATES PATENT OFFICE.

JEFFIE L. BATES, OF BELMONT, MISSISSIPPI.

CULTIVATOR.

Application filed September 27, 1923. Serial No. 665,061.

*To all whom it may concern:*

Be it known that I, JEFFIE L. BATES, a citizen of the United States, residing at Belmont, in the county of Tishomingo and State of Mississippi, have invented certain new and useful Improvements in Cultivators, of which the following is a specification.

This invention relates to certain new and useful cultivators and has particular reference to cultivators of the straddle row type.

The primary object of the invention is to provide a cultivator of the above kind which embraces the desired qualities of simplicity, durability, and efficiency in operation.

A further object of the invention is to provide a cultivator of the above type, wherein a frame is provided that has supporting wheels at the forward end thereof and cultivator teeth at the rear end thereof, the same including a beam provided with handles at its rear end adapted to be manipulated by an operator walking in the rear of the cultivator for regulating the depth of the teeth to cut the soil.

Other objects consist in the provision of an efficient means for shielding the plants against damage or being covered during the operation of the cultivator teeth and to generally simplify and improve devices of this kind whereby the same may meet with all of the requirements for successful commercial use.

Other objects will appear as the nature of the invention is better understood, and the same consists in the novel form, combination, and arrangement of parts hereinafter more fully described, shown in the accompanying drawings and claimed:

In the drawings, wherein like reference characters indicate corresponding parts throughout the several views:

Figure 1 is a top plan view of a cultivator constructed in accordance with the present invention.

Figure 2 is a side elevational view thereof.

Figure 3 is an enlarged detail sectional view taken substantially upon the line 3—3 of Figure 1.

Figure 4 is a bottom plan view of one of the teeth bars and the teeth attached thereto, and Figure 5 is a perspective view of the plant shield and its drag bar.

Referring more in detail to the drawings, the invention embodies a frame consisting in a central longitudinal beam or tongue 5, the forward end of which is provided with means as generally indicated at 6, by means of which draft animals may be coupled thereto in a well known manner, said beam being provided at its rear end portion with handles 7, similar to the handles found upon common forms of hand controlled plows. The handles are braced, as at 8 and 9 against lateral and vertical strains as well as against separation in a well known manner and they incline upwardly and rearwardly so that their rear ends terminate at the proper height to be conveniently grasped by the operator, it being understood that these handles are positioned with their rear ends sufficiently beyond the rear end of the beam 5 to prevent the operator from necessarily standing close to the cultivator teeth or to be subjected to the soil dug thereby.

The cultivator frame further includes a pair of cross bars 10 and 11 respectively rigidly secured to the beam 5 adjacent the forward end of the latter and substantially intermediate the ends of the same, the preferred manner of attachment consisting in bolting the same centrally to the beam as indicated at 12 with the cross bars disposed in contact with the under surface of the beam as shown.

A longitudinal side frame bar 13 is disposed in spaced relation to and at each side of the beam 5 upon the outer ends of the cross bars 10 and 11, so that the beam and longitudinal side bars 13 are in parallel relation, and these side longitudinal frame bars 13 are bolted upon the ends of the cross bars 10 and 11 as indicated at 14. The side frame bars 13 are of such length as to extend from the forward cross bar 10 to a point beyond the rear cross bar 11, and a pair of rearwardly diverging tooth bars 15 are provided in spaced relation at opposite sides of the beam 5 with their forward inner ends rigidly attached as by bolting or the like at 16 to the projecting rear ends of the side frame bar 13 as clearly shown in Figure 1. The tooth bars 15 are preferably relatively broad or wide as shown, and bevelled so as to flatly engage the rear edge of the cross bar 11 as at 17 for bracing said tooth bars and relieving the bolt 16 of strains during the use of the device, the tooth bars being preferably disposed against the under surfaces of the rear ends of the side frame bars 13 as shown. A pair of supporting wheels 18 are provided for the forward end of the cultivator frame, and each of these wheels are journalled in line with one of the side frame bars 13 by means of a wheel mount 19 of any preferred or well known form provided at each side of the forward end of the frame as shown in Figures 1 and 2. The cultivator frame may thus be tilted vertically about the axes of the supporting wheels 18 by the operator engaging the handle 7 for regulating the depth at which the cultivator penetrates the soil as will presently become apparent.

Carried by each of the tooth bars 15 are a plurality of resilient spring cultivator teeth 20 of the spring wire drag type or the like, and these teeth are preferably detachably fastened to the tooth bar by bolting their forward ends against the under surfaces of the tooth bar, as generally indicated at 21. The teeth are held against lateral swinging and rigidly held against the rear portions of the under surfaces of the tooth bars by means of clamping bars 22, that are bolted or the like, as at 23, to the under sides of the tooth bars 15 along their rear edges. Under certain conditions, each tooth bar will carry three teeth, although it is obvious that by the provision of a desired number of openings for the bolt 21, a lesser or greater number of teeth may be employed to suit the particular conditions under which the implement is used.

An inverted substantially U-shaped plant shield 24 that is preferably constructed of bent sheet metal is arranged longitudinally of the cultivator substantially beneath the rear end of the beam 5, and this shield is attached to the beam by means of a resilient drag bar 25 that is constructed of yieldable sheet metal for permitting the vertical yielding of the plant shield, whereby hills or obstructions may be readily cleared without causing damage. To insure riding of the shield over irregularities in the soil or the like, the forward ends of the shield 24 are preferably levelled as at 26. The shield 24 is thus disposed between the two central gangs of teeth in position to permit the small plants to pass between the sides of the shield whereby the dirt will not be allowed to damage the plants or to cover the same.

The operation of the device is similar in essential respects to that of all cultivators of this general type and it is believed that the construction and operation as well as the advantages of the invention will be readily understood and appreciated from the foregoing description.

Minor changes may be made without departing from the spirit and scope of the invention as claimed.

What I claim as new is:

A straddle row cultivator comprising a frame including a centrally disposed beam, a pair of handles rigidly secured to the inner end of the beam for manipulation by a walking attendant, a pair of longitudinally disposed side bars positioned in spaced parallelism from opposite sides of said beam, said side bars being of a length less than the beam, a pair of longitudinally spaced cross bars secured to the under faces of said beam and side bars, the cross bar at the inner end of the device being spaced inwardly from the corresponding ends of the side bars, a pair of rearwardly diverging members comprising main bars secured to the under side of the aforesaid side bars and having their inner ends abutting the adjacent cross bar, bolts extending through said diverging main bars, clamping bars carried by the main bars, and cultivating teeth provided at their free ends with eyes connected to said bolts and having their intermediate portions held against said main bars by said clamping bars.

In testimony whereof I affix my signature.

JEFFIE L. BATES.